United States Patent
Fitzhugh

(10) Patent No.: US 7,797,135 B2
(45) Date of Patent: Sep. 14, 2010

(54) METHOD AND APPARATUS FOR CORRECTING THE TIME OF RECORDAL OF A SERIES OF RECORDINGS

(75) Inventor: Andrew Fitzhugh, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 938 days.

(21) Appl. No.: 11/514,775

(22) Filed: Sep. 1, 2006

(65) Prior Publication Data

US 2008/0125996 A1 May 29, 2008

(51) Int. Cl.
*G06F 11/30* (2006.01)

(52) U.S. Cl. .............. 702/186; 702/176; 702/177; 702/187; 702/188

(58) Field of Classification Search ......... 702/186–188
See application file for complete search history.

(56) References Cited

U.S. PATENT DOCUMENTS

| | | | |
|---|---|---|---|
| 5,296,884 A | 3/1994 | Honda et al. | |
| 5,506,644 A | 4/1996 | Suzuki et al. | |
| 5,671,451 A | 9/1997 | Takahashi et al. | |
| 5,768,640 A | 6/1998 | Takahashi et al. | |
| 5,828,751 A * | 10/1998 | Walker et al. | 713/175 |
| 5,913,078 A | 6/1999 | Kimura et al. | |
| 6,091,956 A | 7/2000 | Hollenberg | |
| 6,160,964 A | 12/2000 | Imoto | |
| 6,181,878 B1 | 1/2001 | Honda | |
| 6,292,633 B1 | 9/2001 | Nakagawa | |
| 6,304,729 B2 | 10/2001 | Honda et al. | |
| 6,322,181 B1 | 11/2001 | Silverbrook | |
| 6,351,613 B2 | 2/2002 | Ohkado | |
| 6,359,837 B1 | 3/2002 | Tsukamoto | |
| 6,690,883 B2 | 2/2004 | Pelletier | |
| 6,701,079 B1 | 3/2004 | Bojan | |
| 6,930,713 B1 | 8/2005 | Adams et al. | |
| 2006/0015245 A1 * | 1/2006 | Janssen | 701/117 |
| 2006/0294096 A1 * | 12/2006 | Kraus et al. | 707/6 |
| 2007/0115373 A1 * | 5/2007 | Gallagher et al. | 348/231.3 |

FOREIGN PATENT DOCUMENTS

JP 406067291 A * 3/1994

OTHER PUBLICATIONS

Nikon—"The New Definition of Professional Quality" Brochure for the Nikon D2X camera—http://www.askbjoernhansen.com/archives/2004/09/15/d2x/d2x_english.pdf.

* cited by examiner

*Primary Examiner*—Hal D Wachsman
*Assistant Examiner*—Mi'schita' Henson

(57) ABSTRACT

A process for correcting the time stamp of recordings such as photographs, obtained in many locations. An onboard clock records a time stamp for each photograph. GPS tracking data is obtained during movement of the camera. A time correction is sought, to account for an unknown error in the onboard clock, relative to the trusted GPS time data. To this end, an assigned location of each photograph is generated from the location tracking data and from an estimated time correction. Indicators of an appropriate time correction include clustering of the assigned locations, and correlation of the assigned locations to locations of reduced velocity. A GUI can be used to enable user assessment of clustering and/or correlation, and indication of a suitable time correction. Or, algorithmic assessment can be used. The determined time correction can be used to correct each photograph's time stamp.

14 Claims, 2 Drawing Sheets

METHOD AND APPARATUS FOR CORRECTING THE TIME OF RECORDAL OF A SERIES OF RECORDINGS

FIELD OF THE PRESENT INVENTION

The present invention relates generally to the time of recordal of each recording in a series of recordings obtained in multiple locations, and more specifically relates to correcting the time of recordal by reference to location tracking data which has trusted time data.

BACKGROUND OF THE PRESENT INVENTION

Many portable recording devices are available with which a series of recordings may be obtained while travelling amongst several locations. Such devices are often able to associate with each recording a time stamp to indicate a time and date when that recording was obtained. The time stamps are usually derived from an on-board clock of the device.

It is usually incumbent upon the user to ensure that the on-board clock of a recording device is accurately set. Manually setting the on-board clock inherently involves inaccuracy stemming from human error, from the dexterity of the user, and/or from the reference time relied upon. Further, it is common for a user to simply neglect to change or set the on-board clock upon purchase of the device.

Similarly, it is common for a user to neglect to adjust the on-board clock upon movement to a different time zone, or upon seasonal time changes within a time zone. On-board clocks can also suffer from some amount of drift, which can become significant over time. Consequently the accuracy of an on-board clock, and in turn the accuracy of time stamps associated with recordings, often can not be considered to be reliable.

Separately to the preceding issues, a technique for associating locations with time stamped media such as digital photos has recently come about. This technique simply involves carrying a global positioning system (GPS) device along with a camera. The camera is used to record a series of photos each having an associated time stamp derived from an on-board clock. Meanwhile, the GPS device separately records a tracklog in the usual manner, the tracklog being a series of samples of location and time.

Subsequently, post-processing is performed to assign a location from the tracklog to each photo, based on corresponding timestamps. The time in GPS data can be considered to be trusted time data in such applications. However, the on-board clock in the user's camera is rarely synchronized to the GPS time. Such time discrepancies will lead to incorrectly assigned locations.

U.S. Pat. No. 6,690,883 provides for a self-annotating camera. The camera is operable to annotate a photograph with a number of types of data, including time data obtained from an on-board clock, and location data retrieved from an external GPS device. This camera must therefore be provided with sufficient capabilities to interface with an external GPS device. Further, once again the time data of the on-board clock can not be relied upon.

Other interfaces to align camera time to GPS time have proven to be prohibitively labor intensive and prone to error, and are thus inadequate solutions in consumer applications. One correction method allows the user to specify a time zone, which will generally correct the camera time by some integral number of hours. This method does not account for a camera clock that is wrong in minutes or seconds.

Another method allows the user to specify an arbitrary time offset. However, the user carries the burden of determining that time offset. One way is to simply look at the time displays in both devices simultaneously and calculate the difference. In addition to the inconvenience to the user of such arithmetic, this approach is problematic when one or both of the camera and GPS device do not show seconds, or if the camera clock has been reset or drifted after the photos were taken and before the alignment is attempted.

The user can also determine the arbitrary time offset by taking a photo of the GPS time display, thus capturing a photo that has a camera timestamp and a visual depiction of the GPS time in the single artefact. The time correction can then be carried out accurately in the future. Although more reliable, this still requires an amount of work that is prohibitive to most consumers.

SUMMARY OF THE PRESENT INVENTION

A process for correcting the time of recordal of a series of recordings is provided. The series of recordings are obtained in a plurality of actual locations by a recording device. The recording device has a clock used to record a time of recordal of each recording. Location tracking data corresponding to movement of the recording device among the plurality of actual locations is obtained, the location tracking data including trusted time data. From the location tracking data, an assigned location of each recording in the series of recordings is generated. The assigned locations are compared to the actual locations. The assigned locations are regenerated using an adjusted time correction which better matches the assigned locations to the actual locations. The adjusted time correction is then used to correct the time of recordal of each recording.

BRIEF DESCRIPTION OF THE DRAWINGS

FIG. 2b is a plot of velocity vs. location and rate of picture taking vs. location, for a time offset of 5, for the same picture and GPS data as FIG. 2a.

DETAILED DESCRIPTION OF EMBODIMENTS OF THE PRESENT INVENTION

Figure 1:
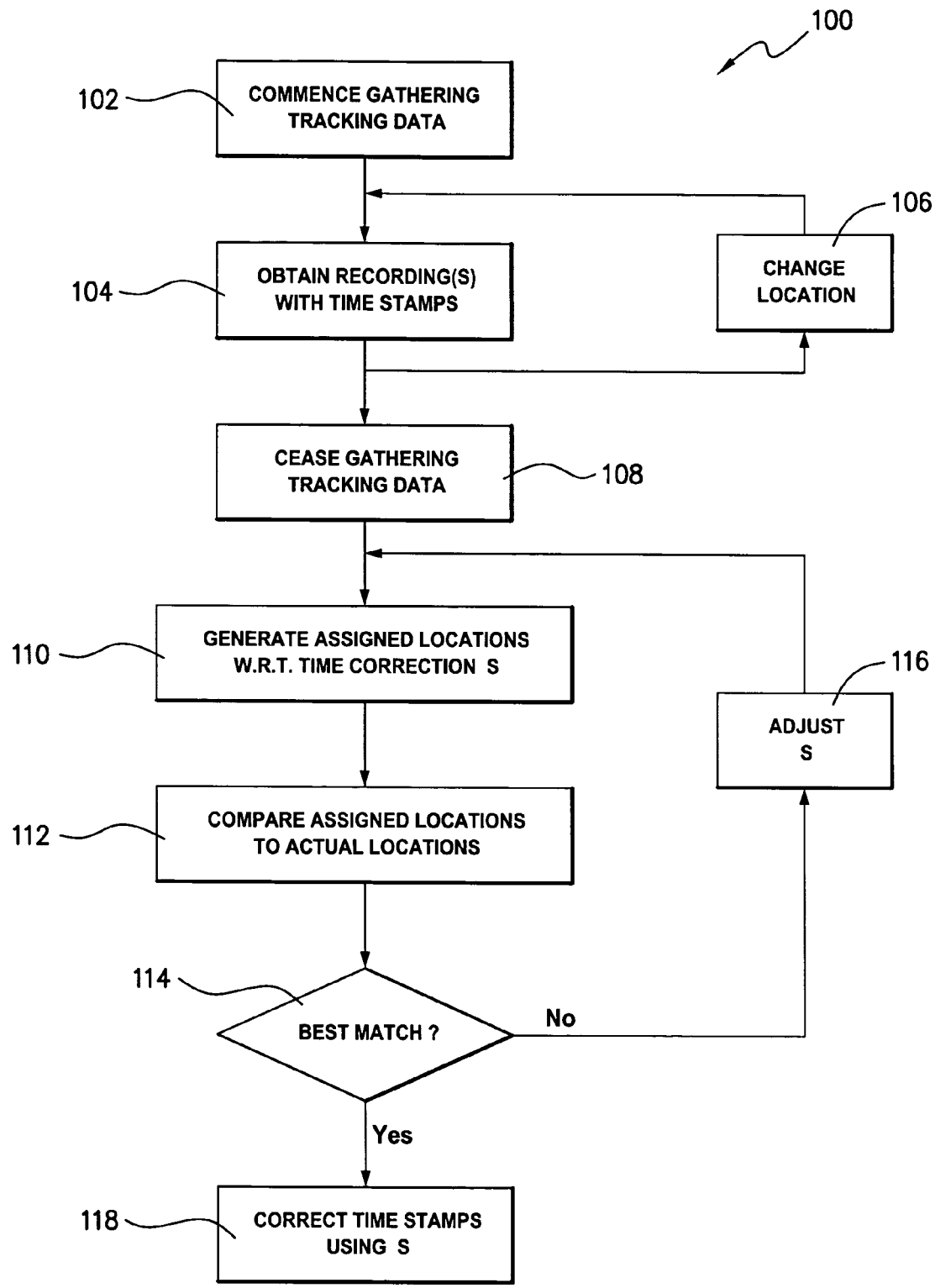
FIG. 1 is a flowchart of the process of the present invention.

FIG. 1 is a flowchart of a process 100 in accordance with a first embodiment of the invention. At 102, the process begins by initiating the gathering of tracking data, in the form of GPS tracking data. The GPS track log, comprising a series of samples of location and time, is thus a source of trusted time and location data. At 104 a user obtains recordings, which are each captured with an accompanying time stamp representing a time of recordal of that recording, as measured by an on-board clock of the recording device. Such recordings are obtained throughout a plurality of locations as indicated by 106.

Once a series of recordings have been obtained throughout multiple locations, the gathering of tracking data is ceased at 108.

At 110, an assigned location is generated for each recording, by comparing the time stamp of each recording to a corresponding time record of the GPS tracking data, and the accompanying location information. A time correction "s" is initially set to zero. The assigned locations generated at step 110 are compared to the actual locations at which the recordings were obtained, at step 112. Such a comparison may be carried out in a number of ways, as discussed in further detail in the following.

At step 114, a decision is made as to whether a best match between the assigned locations and the actual locations has been obtained. If not, at 116 the time correction "s" is adjusted, and steps 110, 112 and 114 are repeated. Once it is determined that a best match of the assigned locations to the actual locations has been achieved by variation of the time correction s, the process moves to block 118, where the time correction s is used as a quantum by which the time stamp of each recording is corrected.

It is to be noted that in alternate embodiments the iterative process of steps 110, 112, 114 and 116 may instead be replaced with a single step metric to compute an appropriate time correction s.

The invention recognises that a time stamp accompanying a recording such as a photograph may not be reliable, but that a characteristic of the record, or a characteristic of the set of records, may reliably convey the location in which the or each record was obtained. The invention further recognises that location tracking data which contains both reliable location data and reliable time data may be used to determine with improved reliability a time at which the record was created or obtained, by reference to the location at which the record was obtained.

In some circumstances the time stamp clock of the recording device may undergo appreciable drift, and/or may be reset, during the time period in which the series of recordings is obtained. In such circumstances, it is to be appreciated that not all assigned locations will necessarily correctly match the actual locations. However, provided application of the time correction is such that the assigned locations are a better match to the actual locations, the time correction can still be used to correct the time of recordal of each recording, and such embodiments therefore fall within the scope of the present invention. In such circumstances it may be suitable to assess a subset of the records which were obtained over a shorter time period.

The recordings may be photographs obtained by a camera, whether film photographs or digital photographs obtained by a digital camera. The recordings may alternatively be film or digital video recordings, or sound recordings.

Thus, this invention provides means for referencing the on-board clock time to GPS time. As discussed further in the following, this can be achieved without user intervention, or in combination with user feedback in response to a dynamic graphical display.

The automatic method of matching the assigned locations to the actual locations, in one embodiment of the invention, is based on the observation that two aspects of a person's behaviour, the rate of movement and the rate of picture taking, are generally correlated. People usually stop moving when taking a photo, and are less likely to take a photo when in motion.

When plotting photos on a map along a path travelled, clusters of points are readily apparent at points of interest where multiple photos were taken and where travel ceased or slowed. If the 2-dimensional path is effectively repositioned along a straight line, preserving distance between points, the clusters are seen in a simpler 1-dimensional form. This spatial clustering results from typical photo taking behaviour: the user travels to a spot, takes a few photos, travels to another spot, takes some more photos, etc.

Figure 2A:
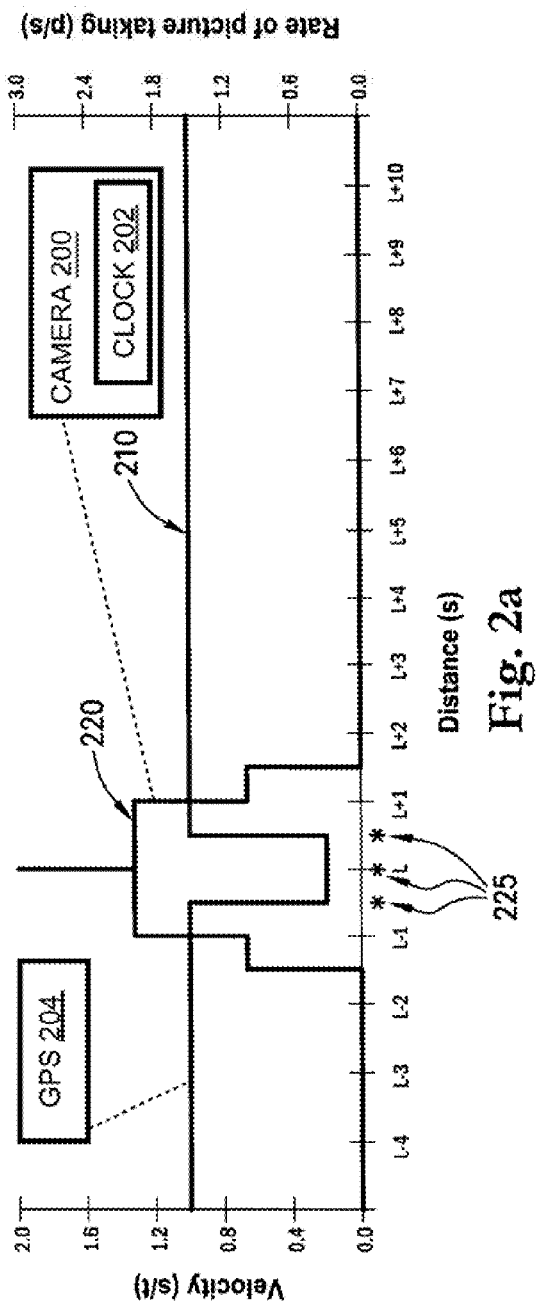
FIG. 2a is a plot of velocity vs. location and rate of picture taking vs. location, for a time offset of 0.

These effects are illustrated in FIG. 2a, which shows a plot 210 of velocity vs. location, derived from GPS tracking data. Plot 210, being generated only from GPS data, is thus a trusted reference. Further, variation of a time offset does not influence plot 210. FIG. 2a further shows a plot 220 of rate of picture taking vs. location, derived from both the time stamp data produced from the on-board clock and from the GPS data, assuming a time offset of 0 between the on-board clock and the GPS data.

In the data plotted in FIG. 2a, three photos are taken closely together in time when the user is at or near location L.

Before reaching location L, it can be seen from plot 210 that velocity was constant and substantially greater than zero. Upon reaching location L, velocity falls to close to zero. As velocity is determined by reference to periodically obtained location and time data of the GPS system, and not from a continuous velocity meter, determined velocity does not fall to zero at location L, even though the user's actual velocity might have. Nevertheless, it can be determined that a measurable reduction in velocity occurred at or near location L which is sufficient to implement the present technique. After location L, it can be seen from plot 210 that velocity returns to the earlier constant level substantially greater than zero.

Figure 2B:
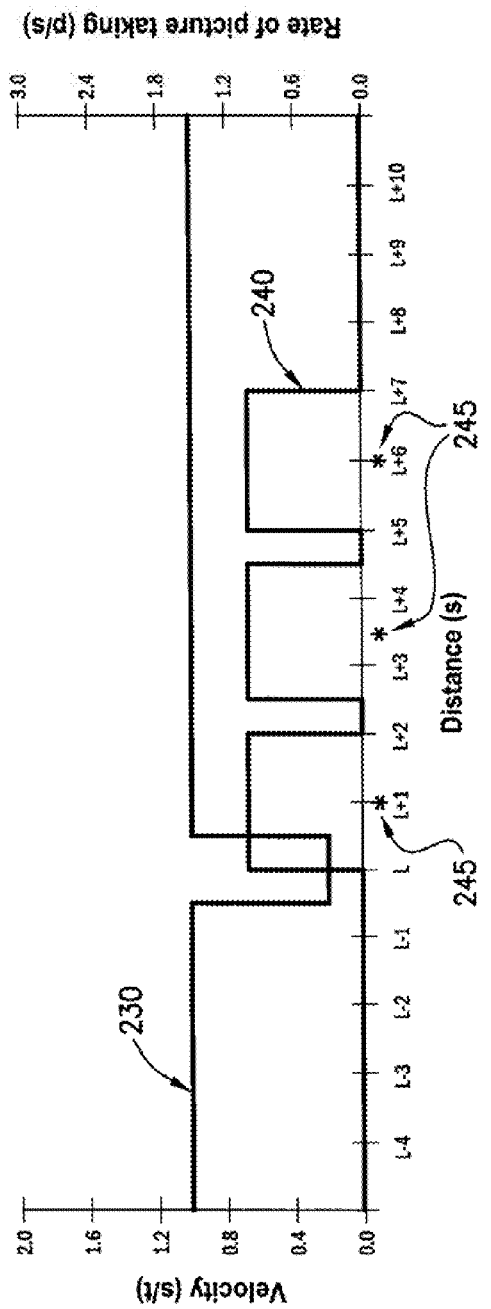

It is to be noted that the data of FIGS. 2a and 2b is simple clean data, selected for to provide a clear illustration of this embodiment of the invention. It is to be expected that most real world data sets will comprise significant noise and/or be poorly conditioned. Thus, compensatory processing of such real world data, such as by filtering or noise reduction whether prior to or simultaneously with the techniques of the present invention, may be carried out in some embodiments of the present invention.

In considering plot 220 of FIG. 2a, it can be seen that when a time offset is zero between the trusted GPS time data and the on-board clock used to generate time stamps of the recordings, the plot 220 of rate of picture taking vs. location reveals a cluster of points at or near where velocity ceased or was reduced. That is, typically the user will have stopped moving in order to take photos or make recordings.

Asterisks 225 indicate the assigned location of each of the three photos. Each asterisk location is computed by traversing the velocity function 210 from left to right; the amount of time spent in each distance interval of width L is L/V(s); thus time is simply accumulated by summing these values for each successive distance interval. With the correct time offset of 0, each photo is correctly given an assigned location at L±0.5 distance units.

The vertical axis for plot 220 represents the number of photos taken over the respective distance interval. It is calculated by choosing a time offset (0 in FIG. 2a) between the GPS clock and the device clock, assigning a location to each picture, then integrating the number of photos over a specified distance interval. The plot 220 represents these data. An interval width of 2L has been used when integrating in the example shown in FIG. 2a. Function 220 is thus essentially determined by counting the number of asterisks 225 in each distance interval of width 2L.

Having noted this typical characteristic behaviour, the present invention further recognises that a notable effect arises when photos are plotted on a one dimensional or two dimensional map using locations derived from times assuming an incorrect time correction. This effect is that photos that should appear clustered at a single location may spread out to locations before or after the correct location on the travelled path.

FIG. 2b is derived from the same photo data and GPS track log as FIG. 2a, with the difference that a time offset of 5 time units exists between the trusted GPS time data and camera on-board clock used to generate the photo time stamps. In more detail, FIG. 2b shows a plot 230 of velocity vs. location, derived from GPS tracking data. FIG. 2b further shows a plot 240 of rate of picture taking vs. location, derived from both the time stamp data produced from the on-board clock and from the GPS data, where the time offset between the on-board clock and the GPS data is 5 time units.

Plot 230 is, as expected, not changed by altering the time offset. However, plot 240 is substantially different to plot 220. Asterisks 245 indicate the assigned location of each of the three photos with time offset 5. Each asterisk location is computed by traversing the velocity function 230 from left to right; the amount of time spent in each distance interval of width L is L/V(s); thus time is simply accumulated by summing these values for each successive distance interval. With the incorrect time offset of 5, each photo is assigned a location beyond the period when the person was relatively stationary, and the three photos are more dispersed in distance in plot 240. That is, the relative time differences between the photos is the same, but the person's velocity between them is greater, thus a greater distance separates the photos by this calculation.

The non-clustered nature of the assigned locations in plot 240, and the non-alignment of the assigned locations with the period of reduced velocity in plot 230, gives an indication that a non-zero time offset exists between the trusted GPS time data and the on-board clock used to generate time stamps of the photos.

Accordingly, a first method to compare the assigned locations to the actual locations in order to ascertain the time offset is to assess the correlation of maxima in plots 240, 220 with minima in plots 210, 230, as the time offset varies. One embodiment of the invention comprises an interactive, graphical method in which the time offset is bound to a graphical slider controlled by a user. The plots of FIG. 2, or the like, are updated dynamically as user movement of the slider alters the time offset. The user would be able to visually see the optimal alignment of the functions emerge. Such a visual technique enabled by a suitable graphical user interface provides for an extremely simple solution to the problem of a time offset between an on-board clock and GPS data.

In a second method of comparing the assigned locations to the actual locations, we let:

t=time of a photo assigned by the camera
s=time shift correction used to align camera clock with GPS clock
L(t, s)=the location assigned to a photo taken at camera time, t, assuming time correction, s.
$R_t(t, s)$=the number of photos taken per unit time at time t, assuming time correction, s.
$R_d(t, s)$=the number of photos taken per unit distance at time t, assuming time correction, s.

The shape of $R_t(t, s)$ does not change as different values are used for s, the profile merely shifts to the left or right. On the other hand, the shape of $R_d(t, s)$ will indeed change as s varies. As noted above, incorrect values of s will tend to make space-clustered photos spread out in space. As s is made too small or too large, the position, width, and/or amplitude of peaks in $R_d(t, s)$ will change, leading $R_d$ to become less similar to $R_t$. The value of s which results in the best match between $R_d(t, s)$ and $R_t(t, s)$ will indicate the correct time offset between the camera and GPS clocks.

In determining the best match between $R_d(t, s)$ and $R_t(t, s)$ a statistical correlation may be suitable, but a more complex function may alternatively be used.

A third method of comparing the assigned locations to the actual locations in order to determine the best match between them, is to plot photos on a map at locations given by L(t, s) while allowing the user to dynamically vary s. The map could be one dimensional linear map, or a two dimensional road map, topographic map, or other type of map. While varying s, the user can visually optimize the clustering on the map, and/or optimize the correspondence of photos with known, indicated landmarks on the map. When the visual optimization or correlation is complete, the time offset indicated by the slider control will indicate the time offset between the camera on-board clock and the GPS clock.

The first and third methods thus provide a single graphical control, a linear slider, to dynamically update the characteristics of a visual display. The interface is constructed in a manner so that when an optimal setting is chosen by the slider, the display indicates this unambiguously. This requires no user calculation or arithmetic, and no access to the recording device or GPS device; it is a simple task for an untrained user to accomplish.

These embodiments of the invention thus simplify the production of geo-referenced photos by using a camera 200 with an onboard clock 202 and an independent GPS device 204, and may thus enable a broader user community to produce such data. While a GPS device integrated into a digital camera, or interfacing with the digital camera such as is set out in U.S. Pat. No. 6,690,883, would avoid this problem, such cameras are not generally available to consumers. On the other hand standalone GPS devices are generally available. Making the production of geo-referenced photo data practical for inexpert users will be a critical enabler for many kinds of location-based services, services that cannot be justified unless there is enough available data.

In FIG. 1, at step 112 the assigned locations generated at step 110 are compared to the actual locations at which the recordings were obtained. It is to be appreciated that making of such a comparison does not necessarily require a priori knowledge of the actual locations themselves. As described in the first and second methods in the preceding, this comparison may be made by referring to alternative secondary information such as GPS time and location data. On the other hand, other embodiments, such as the third method set out in the preceding, may rely on the user's own knowledge of the actual locations themselves to carry out the comparison.

In a further aspect there is provided a process for automatically correcting the time of recordal of a series of recordings. The series of recordings are obtained in a plurality of actual locations by a recording device having a clock used to record a time of recordal of each recording. Location tracking data corresponding to movement of the recording device among the plurality of actual locations is obtained, the location tracking data including trusted time data. From the location tracking data and from a time correction an assigned location of each recording in the series of recordings is generated. From the series of recordings a first histogram is generated representing a number of recordings obtained per unit time. From the assigned locations a second histogram is generated representing a number of recordings obtained per unit distance. The assigned locations, the first histogram, and the second histogram are regenerated using an adjusted time correction which better matches the second histogram to the first histogram. The time of recordal of each recording is then corrected using the adjusted time correction.

In a still further aspect there is provided a process for correcting the time of recordal of a series of recordings. The series of recordings are obtained in a plurality of actual locations by a recording device having a clock used to record a time of recordal of each recording. Location tracking data corresponding to movement of the recording device among the plurality of actual locations is obtained, the location tracking data including trusted time data. From the location tracking data and from a time correction an assigned location of each recording in the series of recordings is generated. The assigned locations are displayed for a user, for comparison to the actual locations. User input of an adjusted time correction to better match the assigned locations to the actual locations is accepted. The time of recordal of each recording is corrected using the adjusted time correction.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A process for obtaining a series of recordings with corrected times of recordal, the process comprising:
    using a recording device to obtain said series of recordings in a plurality of actual locations;
    having a clock of said recording device record a time of recordal for each recording of said series;
    obtaining location tracking data corresponding to movement of the recording device among the plurality of actual locations, the location tracking data including trusted time data;
    generating from the location tracking data and from a time correction an assigned location of each recording in the series of recordings;
    comparing the assigned locations to the actual locations;
    regenerating the assigned locations using an adjusted time correction which better matches the assigned locations to the actual locations; and
    correcting the time of recordal of each recording using the adjusted time correction.

2. The process of claim 1 wherein the comparing comprises graphically presenting the assigned locations to a user for comparison.

3. The process of claim 2 comprising graphically presenting rate of obtaining recordings vs. location information to the user for comparison.

4. The process of claim 3 comprising graphically presenting velocity vs. location information to the user for comparison.

5. The process of claim 2 comprising graphically presenting velocity vs. location information to the user for comparison.

6. The process of claim 2 further comprising accepting user input for adjustment of the time correction, and dynamically updating the graphical presentation in response to user input.

7. The process of claim 1 wherein the comparing comprises determining a correlation between (a) minima in velocity vs. location and (b) maxima in rate of obtaining recordings vs. location.

8. The process of claim 7 wherein the better match is derived by varying the time correction to maximize the correlation.

9. The process of claim 1 wherein the comparing comprises determining an extent of clustering of the assigned locations.

10. The process of claim 9 wherein the better match is derived by varying the time correction to maximize the clustering.

11. A process for obtaining a series of recordings with corrected times of recordal, the process comprising:
    using a recording device to obtain said series of recordings in a plurality of actual locations;
    having a clock of said recording device record a time of recordal for each recording of said series;
    obtaining location tracking data corresponding to movement of the recording device among the plurality of actual locations, the location tracking data including trusted time data;
    generating from the location tracking data, from the time of recordal, and from a time correction an assigned location of each recording in the series of recordings;
    generating from the series of recordings a first histogram representing a number of recordings obtained per unit time;
    generating from the assigned locations a second histogram representing a number of recordings obtained per unit distance;
    regenerating the assigned locations, the first histogram, and the second histogram, using an adjusted time correction which better matches the second histogram to the first histogram; and
    correcting the time of recordal of each recording using the adjusted time correction.

12. A system for automatically correcting the time of recordal of a series of recordings, the series of recordings obtained in a plurality of actual locations by a recording device having a clock used to record a time of recordal of each recording, the system comprising:
    an interface for obtaining location tracking data corresponding to movement of the recording device among the plurality of actual locations, the location tracking data including trusted time data;
    an assigned location generator for generating from the location tracking data and from a time correction an assigned location of each recording in the series of recordings;
    a first histogram generator for generating from the series of recordings a first histogram representing a number of recordings obtained per unit time;
    a second histogram generator for generating from the assigned locations a second histogram representing a number of recordings obtained per unit distance;
    a time correction controller for adjusting the time correction such that regenerating the assigned locations, the first histogram, and the second histogram, better matches the second histogram to the first histogram; and
    a recording editor for correcting the time of recordal of each recording using the adjusted time correction.

13. A process for obtaining a series of recordings with corrected times of recordal, the process comprising:
    using a recording device to obtain said series of recordings in a plurality of actual locations;
    having a clock of said recording device record a time of recordal for each recording of said series;
    obtaining location tracking data corresponding to movement of the recording device among the plurality of actual locations, the location tracking data including trusted time data;
    generating from the location tracking data and from a time correction an assigned location of each recording in the series of recordings;
    displaying for a user the assigned locations, for comparison to the actual locations;
    accepting user input of an adjusted time correction to better match the assigned locations to the actual locations; and
    correcting the time of recordal of each recording using the adjusted time correction.

14. A process for obtaining a series of recordings with corrected times of recordal, said process comprising:
    using a recording device to obtain said series of recordings having assigned location and time data such that each of said recordings having an assigned location corresponding to an actual location at which the recording was obtained, and each of said recordings having an assigned time corresponding to a time indicated by a clock of said recording device at the time the recording was obtained;

using a location tracking system to obtain tracked data, said track data including tracked location and trusted-time data for said recording device for a time interval over which said series of recordings were made;

determining a time correction that, when applied to said assigned times, provides for an improved correspondence between tracked locations and assigned locations assuming that assigned times with the time correction applied correspond to trusted time; and for each of said recordings, determining a respective time of recordal by applying said time correction to its assigned time.

* * * * *